Aug. 24, 1937.  S. MATZNER  2,091,154
APPARATUS FOR INSTRUCTING AND TESTING AUTOMOBILE DRIVING
Filed July 15, 1936
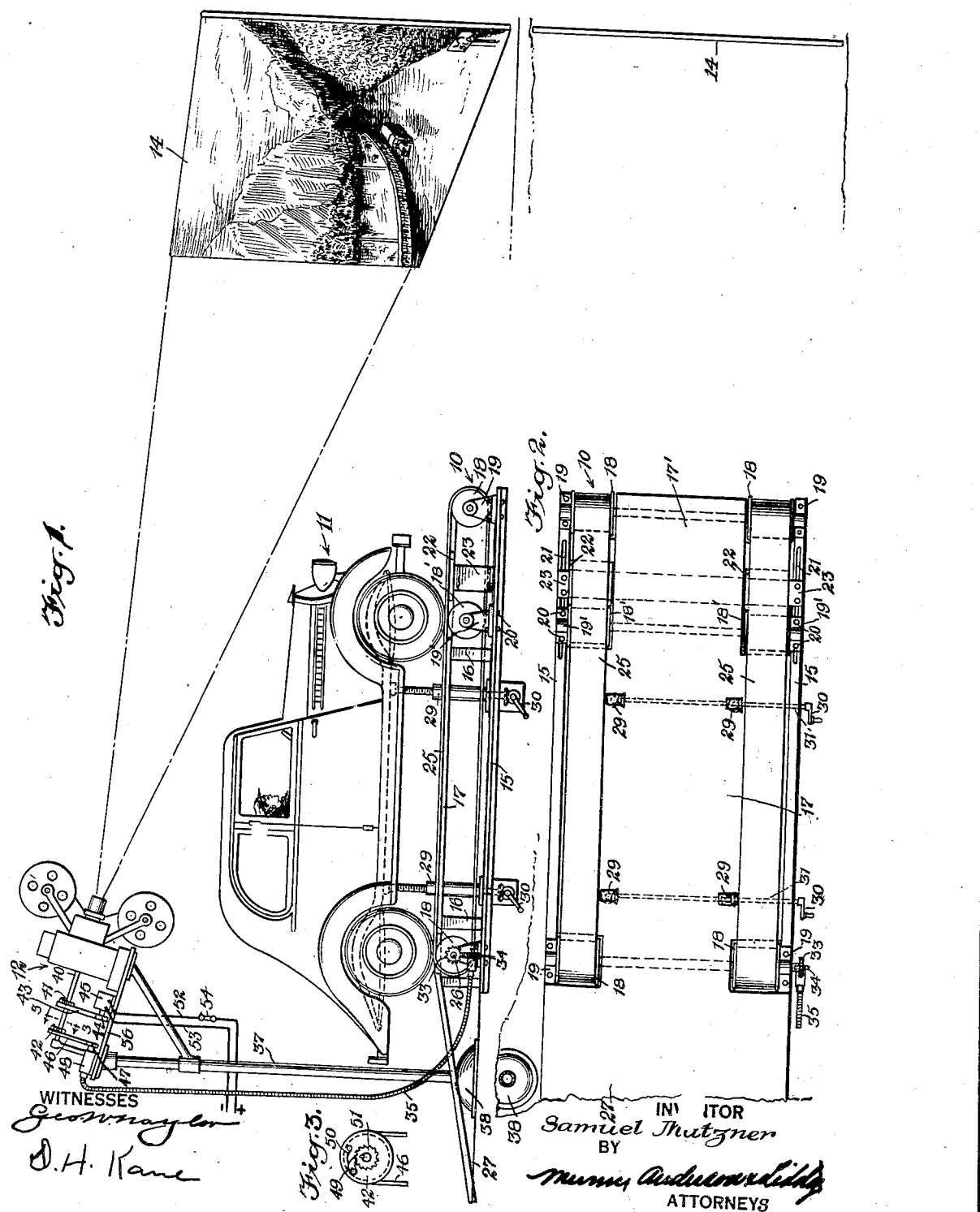

Patented Aug. 24, 1937

2,091,154

UNITED STATES PATENT OFFICE 2,091,154

APPARATUS FOR INSTRUCTING AND TESTING AUTOMOBILE DRIVING

Samuel Matzner, Brooklyn, N. Y.

Application July 15, 1936, Serial No. 90,719

6 Claims. (Cl. 35—11)

This invention relates to improvements in apparatus for instructing and testing automobile driving.

It is an object of the invention to provide improved apparatus whereby a novice driver can attain practical instruction in automobile driving under realistic conditions using a standard type of automobile or using automobile driving mechanism similar in construction and operation to that of a standard automobile without the necessity of actually driving a car on a public street or thoroughfare with the dangers associated therewith.

A further object is the provision of improved apparatus whereby the driving ability and the speed of reaction of an automobile driver may be tested under realistic conditions without endangering life or property.

Another object is to provide improved apparatus for instructing driving which not only affords instruction in the operation of the propelling or driving mechanism of the car but also affords instruction and practice in the operation of the steering mechanism under conditions similar to the actual operation of the automobile on a road.

In its broadest aspect my invention contemplates the provision of a moving picture projector or similar apparatus operating in response to the driving mechanism of an automobile, or similar vehicle, and projecting pictures representing approaching or passing landscape on a screen placed adjacent the automobile so as to be visible to the driver thereof. The automobile is mounted on apparatus somewhat similar to a treadmill so that it remains stationary and the driver responds to the various scenes displayed by the moving picture projector on the screen in the same manner as the driver of an automobile on the road responds to what he sees in front of him.

For a fuller understanding of the invention reference should be had to the accompanying drawing in which—

Fig. 1 is a side view of an automobile having associated therewith apparatus for instructing and testing automobile driving embodying my present invention;

Fig. 2 is a plan view of the stand on which the automobile is mounted; and

Fig. 3 is a view in the direction of the arrows on the line 3—3 of Fig. 1.

In carrying out my invention I provide a moving picture projector operating in synchronism with the driving mechanism of an automobile. In so doing I may employ a complete automobile or just the driving mechanism thereof, and, of course, the projector may be connected with the driving mechanism in any desired manner. However, in the preferred form of my invention illustrated in the accompanying drawing, I provide a stand indicated at 10 which serves as a treadmill for a standard type of automobile, indicated at 11, and is connected to a moving picture projector 12 in such a manner that when the driving mechanism of the automobile is operated, moving pictures will be projected upon a screen 14 conveniently located in front of the automobile so as to produce the effect upon the driver thereof of driving along a road in an automobile.

The stand 10 may consist of a pair of longitudinal base members 15 on which are supported by means of the uprights 16 a platform 17 which throughout the greater portion of the length thereof is wider than the gauge of a standard automobile but is provided with a portion of reduced width indicated at 17' at the forward end thereof. Adjacent the two ends of the platform 17 are the rollers 18 mounted on shafts which are journaled in the brackets 19. Intermediate the rollers 18 and positioned adjacent the end of the broader portion of the platform 17 are the rollers 18', the rollers 18' and the rollers 18 disposed at the rear end of the platform being spaced so as to be positioned beneath the four wheels of an automobile when it is mounted on the stand as shown in Fig. 1. The rollers 18' are likewise mounted on a shaft which is journaled in brackets 19' and so that the stand may be able to accommodate cars of varying wheel base lengths, the brackets 19' are provided with adjustable mountings so that the rollers 18' may be shifted with respect to the rollers 18. Thus, the brackets 19' are connected by means of nuts and bolts 20 with slots 21 formed in the base members 15 and by means of this construction the brackets 19 may be shifted along the slots 21 to any desired position according to the length of the wheel base of the car which is to be used on the stand.

Between the rollers 18' and the rollers 18 disposed at the forward end of the platform 17 and at the two sides of the narrow portion 17' of the platform, I preferably provide the adjustable platform extension members 22 supported on brackets 23 which likewise are connected by means of nuts and bolts to the slots 21 so as to be shiftable along the slots and thereby permit of adjustment of the rollers 18'. If desired, the two platform extension members 22 may be connected together by a member extending beneath the narrow portion 17' of the platform, as indicated in dotted lines in Fig. 2, so as to lend additional support to the platform.

Disposed around the front and rear rollers 18, which are provided adjacent each side of the platform member 17 and extending over the platform 17 and the platform extension members 23 and engaging the peripheries of the rollers 18' adjacent the top and bottom thereof, are the endless belts 25. It will be seen that as a result of this structure rotation of the belt will cause rotation of all of the rollers and since the rollers 18 at the rear of the platform are fixedly mounted on a shaft 26, rotation of the belt will likewise cause rotation of the shaft 26. Leading from the ground or floor level to the top of the stand is an inclined run 27 by means of which a car may be conveniently driven or rolled to the top of the stand or be removed therefrom.

To utilize the device a car is driven or rolled up the inclined run 27 until it reaches the position shown in Fig. 1, with the front wheels engaging the portion of the belts 25 disposed above the rollers 18', and with the rear wheels engaging the portion of the belts 25 disposed above the rear rollers 18. So that the principal weight of the car is not borne by the rollers, I preferably provide four supports or jacks 29, preferably of the screw operating type, which are spaced apart so as to engage the frame of the car at four different points. The jacks may be conveniently operated in pairs as by means of handles 30 operating the screw threaded shafts 31 which engage the operating mechanism of the jacks. The jacks are adjusted so as to support the principal weight of the car but so that the wheels, nevertheless, frictionally engage the belts 25, preferably at the points above rollers 18' and the rear rollers 18, with the result that rotation of the rear wheels will cause rotation of the belt and of the rollers.

The rollers 28, which engage the rear wheels of the automobile, are fixedly mounted on a shaft 26, and the shaft preferably forms the driving mechanism for operating the moving picture projector in synchronism with the driving mechanism of the car. On the end of the shaft 26 is mounted a helical gear 33 which meshes with another helical gear 34 which is suitably secured to the end of a flexible cable 35 so that the cable rotates with the gear 34. Rotation of the shaft 26 will, accordingly, result in rotation of the flexible cable 35 which is connected, as hereinbefore stated, so as to cause the operation of the moving picture projector. The moving picture projector 12 may be of any desired construction and is mounted adjacent the stand 10 in such a manner as to project moving pictures on the screen 14. Thus, the projector may be mounted adjacent the end of the inclined platform 36 supported on the stand 37 whose base 38 is disposed adjacent the inclined runway 27.

The moving picture projector, as stated above, is connected so as to operate in synchronism with the driving mechanism of the automobile. In addition to this, I preferably provide auxiliary operating mechanism for causing the projector to operate at a predetermined minimum speed even when the driving mechanism of the automobile is at rest. Thus, the moving picture projector is provided with a drive shaft 40 which causes the operation of the feeding mechanism so as to properly feed a film through the projector to cause the projection of moving pictures on the screen 14. On the shaft 40 are mounted a pair of similar pulley wheels 41 and 42, respectively, the pulley wheel 41 having connection by means of belt 43 to a pulley 44 formed on the electric motor 45 and the other pulley wheel 42 having connection by means of belt 46 to a pulley wheel 47 secured to the end of the flexible cable or shaft 35 which is journaled at 48 adjacent the top of the stand 37.

The pulley wheels 41 and 42 are not fixedly secured to the shaft 40 but have a clutch or ratchet connection therewith, as shown most clearly in Fig. 3, the construction of pulley wheel 41 being similar to that of pulley wheel 42. Thus, on each of the pulley wheels is secured a pawl 49 which is pressed by a spring 50 into engagement with ratchet wheel 51 fixedly secured or keyed to the shaft 40. By this arrangement the projector will be operated by the operating mechanism having the greatest speed, the pawl and ratchet connection on the pulley serving as a clutch to permit the other operating mechanism to be unaffected by the greater speed of rotation of the shaft 40. To be more specific, if the driving mechanism of the car has been stopped so that rotation of the shaft 26, flexible cable 35 and pulley 42 ceases, the motor 45 will continue its operation, with the result that the belt 43 and pulley 41 will rotate in a clockwise direction, as viewed in Fig. 3, and the pawl 49 of pulley wheel 41 will engage its ratchet 51, thereby causing the rotation of shaft 40 and the operation of the moving picture projector. The shaft 40, however, may rotate without any interference with or without any effect upon the pulley wheel 42 due to the fact that the ratchet 51 can rotate in a clockwise direction, as viewed in Fig. 3, with respect to the pawl 49. When the driving mechanism of the automobile is set into operation and the speed is increased so that through the medium of flexible shaft or cable 35 and belt 46, the pulley wheel 42 is driven at a greater speed than the shaft 40 is driven by the motor 45, then the pawl 49 of pulley wheel 42 will engage its ratchet wheel 51 and drive the shaft 40.

The motor 45 is suitably connected, as by means of wires 52 and 53, to a source of current supply and in the circuit a switch 54 is preferably disposed. When the mechanism is arranged, as herein described, an automobile is placed in position on the stand 10, as previously described, and set into operation, it will be seen that the speed of rotation of the rear wheels of the automobile determines the speed of rotation of the belts 25, the rollers 18 and 18', the shaft 26 and the flexible cable 35. As the flexible cable 35 is connected through the medium of pulley wheel 47, belt 46 and pulley wheel 42 to the drive shaft 40 of the moving picture projector, the speed of rotation of the rear wheels of the automobile likewise determines the speed of operation of the projector. In the moving picture projector is placed a film which preferably has been taken from the front of a moving automobile so as to show the panorama which is presented to the driver of the car. All types of hazards, such as are commonly encountered by a motorist, are recorded on the film, including traffic lights during various periods in their cycles of operations, traffic policemen, curves, pedestrians crossing the street, approaching automobiles and the like. Thus, the driver of the testing or instructing automobile 11 views on the screen in front of him a scene similar to that which the driver of an automobile on a public thoroughfare views. The greater the speed of operation of the driving mechanism of the automobile the faster will be the operation of the projector and likewise the slower the operation of the automobile the slower the operation of the projector, with the result that a realistic impression is created.

When a traffic signal indicating that the motorist should stop is indicated on the screen, the student driver immediately stops the driving mechanism of the automobile 11, with the result that the rotation of flexible cable 35, pulley wheel 47, belt 46 and pulley wheel 42 ceases. If no auxiliary drive mechanism, such as the motor 45, were provided, the operation of the moving picture projector would cease, with the result that the stop traffic signal would remain indefinitely on the screen 14. The motor 45, however, continues the operation of the projector at a predetermined minimum speed so as to cause the traffic signal to go through its cycle of operation and when the "Go" signal is indicated on the screen due to the continued operation of the projector, the student driver will again start the driving mechanism of the automobile and when the speed is increased sufficiently the projector will again be operated at a speed proportional to the speed of operation of the driving mechanism of the car.

The ratio of the gears 33 and 34 and the pulley wheels 47 and 42 should be such as to operate the projector 12 at the proper speed so that the moving pictures will be projected on the screen 14 at the proper speed with reference to the speed of operation of the driving mechanism of the car. Likewise the motor 45 should preferably be operated at a relatively low speed so that the predetermined minimum speed of operation of the projector will be slower than that occasioned by the operation of the automobile driving mechanism at ordinary driving speeds.

From the foregoing description it will, accordingly, be apparent that a student driver can receive practical instruction, under realistic conditions, in driving without the necessity of operating an automobile on public thoroughfares. The apparatus may also be employed in testing the speed of reaction of a driver to different situations under varying conditions. The apparatus not only permits of giving instruction in the operation of the driving mechanism of the car but also in the operation of the steering mechanism due to the fact that when the front wheels engage the belt, they will be caused to rotate, with the result that the operation of the steering mechanism when used in association with my apparatus will closely resemble the operation of a steering mechanism under actual driving conditions.

It will be appreciated that due to the fact that the automobile is stationary it will not turn or move in response to the operation of the steering mechanism. Also, operation of the steering mechanism has no effect upon the projected picture. However, the frictional engagement between the front wheels and the rotating belt produces a realistic "feel" or effect when the steering mechanism is operated.

It should be understood, of course, that many modifications may be made in the illustrated and described embodiment of my invention without departing from the invention as defined in the accompanying claims. Thus, the form of the stand and associated mechanism for causing the projector to operate in response to the operation of the driving mechanism may be varied and also instead of employing a complete standard automobile, merely the driving mechanism thereof may be used. My apparatus may also be employed in giving instruction in the operation of other types of vehicles as well as airplanes. In addition to being useful as a device for instructing and testing driving my apparatus may also be employed for demonstration purposes and will be particularly useful in demonstrating new automobiles to prospective purchasers.

I claim:

1. Apparatus for instructing and testing driving comprising a moving picture projector, means for operating said projector at a predetermined minimum speed and means controlled by the driving mechanism of an automobile for operating said projector at speeds greater than the predetermined minimum speed and proportional to the speed of operation of the driving mechanism.

2. Apparatus for instructing and testing driving comprising automobile driving mechanism, a moving picture projector, means for operating the projector at a predetermined minimum speed and means controlled by the automobile driving mechanism for operating said projector at speeds greater than the predetermined minimum speed and proportional to the speed of operation of the driving mechanism.

3. Apparatus for instructing and testing driving comprising automobile driving mechanism, a screen positioned adjacent thereto, a moving picture projector arranged so as to project pictures on the screen, means for operating the projector at a predetermined minimum speed and means controlled by the automobile driving mechanism for operating said projector at speeds greater than the predetermined minimum speed and proportional to the speed of operation of the driving mechanism.

4. An apparatus for instructing in automobile driving comprising front and rear rollers having rotatable mountings and positioned so as to engage the front and rear wheels of a standard automobile, an endless belt connecting the front and rear rollers and a moving picture projector operatively connected with one of said rollers.

5. An apparatus for instructing in automobile driving comprising front and rear rollers having rotatable mountings, an endless belt connecting the rollers, means for supporting a standard automobile so that the front and rear wheels engage the belt adjacent the front and rear rollers respectively, a moving picture projector and means operated by one of said rollers for operating the projector.

6. An apparatus for instructing in automobile driving comprising front and rear rollers having rotatable mountings, an endless belt connecting the rollers, means for supporting a standard automobile so that the front and rear wheels engage the belt adjacent the front and rear rollers respectively, a moving picture projector, means for operating the projector at a predetermined minimum speed and means operated by one of said rollers for operating said projector at speeds above the predetermined minimum speed and proportional to the speed of rotation of the roller.

SAMUEL MATZNER.